United States Patent
Osawa et al.

(10) Patent No.: US 6,700,262 B2
(45) Date of Patent: Mar. 2, 2004

(54) ROTARY ELECTRIC MACHINE

(75) Inventors: Honami Osawa, Tokyo (JP); Munenori Takakuwa, Tokyo (JP); Ryuji Kobayashi, Tokyo (JP); Yukio Ouchi, Tokyo (JP)

(73) Assignee: Sanyo Denki Co., Ltd., Tokyo (JP)

( * ) Notice: Subject to any disclaimer, the term of this patent is extended or adjusted under 35 U.S.C. 154(b) by 147 days.

(21) Appl. No.: 09/943,135

(22) Filed: Aug. 30, 2001

(65) Prior Publication Data

US 2002/0047397 A1 Apr. 25, 2002

(30) Foreign Application Priority Data

Aug. 31, 2000 (JP) .......................................... 2000-263523

(51) Int. Cl.[7] .............................. H02K 5/16; H02K 7/14
(52) U.S. Cl. .............................. 310/91; 310/90; 310/43
(58) Field of Search .............................. 310/90, 91, 43, 310/217, 67 R

(56) References Cited

U.S. PATENT DOCUMENTS 5,363,003 A * 11/1994 Harada et al. ............ 310/67 R
5,650,678 A    7/1997 Yokozawa et al.
6,072,261 A * 6/2000 Lin .............................. 310/91

FOREIGN PATENT DOCUMENTS

| JP | 09-285075 | 10/1997 |
| JP | 2000-054990 | 2/2000 |
| JP | 2000-192899 | 7/2000 |
| JP | 2000-205189 | 7/2000 |
| JP | 2001-186742 | 7/2001 |

* cited by examiner

Primary Examiner—Tran Nguyen
(74) Attorney, Agent, or Firm—Rankin, Hill, Porter & Clark LLP

(57) ABSTRACT

A rotary electric machine such as a fan motor or the like capable of coupling a bearing holder and an insulator to each other without deteriorating accuracy of a diameter of an inner peripheral surface of the bearing holder on which bearings are held. The bearing holder and insulator are coupled to each other by a coupling structure, which is constituted by at least one recess formed on a forward end of the bearing holder and at least one projection provided on the insulator and tightly fitted in the recess. The projection and recess thus fitted together are concurrently heated at a peripheral portion thereof for deformation, resulting in being coupled to each other.

21 Claims, 6 Drawing Sheets

ROTARY ELECTRIC MACHINE

BACKGROUND OF THE INVENTION

This invention relates to a rotary electric machine such as a fan motor or the like, and more particularly to a coupling structure between an insulator of a stator and a bearing holder.

A conventional fan motor which has been known in the art is generally constructed in such a manner that a rotor including a plurality of permanent magnets is rotated about a revolving shaft with respect to a stator including a plurality of salient poles. In the conventional fan motor thus constructed, the stator is mounted on a bearing holder in which at least one bearing for supporting the revolving shaft is fitted. Also, an insulator which is made of a synthetic resin material is arranged so as to cover a part of an outer surface of a stator core of the stator. Further, a coupling structure is provided so as to couple the insulator and bearing holder to each other to prevent relative movement between the bearing holder and the stator in both an axial direction of the revolving shaft and a peripheral direction thereof. For example, a motor disclosed in Japanese Patent No. 2,778,894 and U.S. Pat. No. 5,650,678 corresponding thereto is so configured that a bearing holder is deformed at a forward end thereof toward an insulator by heating, to thereby prevent relative movement between the bearing holder and a stator in an axial direction of a revolving shaft. Also, in the conventional fan motor described above, the bearing holder is provided on an outer periphery thereof with a projection and correspondingly the insulator is provided with a fitted section in which the projection of the bearing holder is fitted. Such construction effectively prevents relative movement between the bearing holder and the stator in the peripheral direction of the revolving shaft.

However, the bearing holder is often substantially varied in thickness during formation of the bearing holder by injection molding of a synthetic resin material or the like. Such a variation in thickness of the bearing holder leads to a so-called resin escaping or receding phenomenon which causes escaping or receding of the synthetic resin material during curing of the synthetic resin. When such a resin receding phenomenon substantially occurs at a portion of the bearing holder on which the bearing is held, the bearing holder is deteriorated in accuracy of an inner diameter thereof or varied in inner diameter. This causes deviation between a center of rotation of the bearing and that of the bearing holder to be increased, leading to vibration of the fan motor, so that it is deteriorated in durability.

SUMMARY OF THE INVENTION

The present invention has been made in view of the foregoing disadvantage of the prior art.

Accordingly, it is an object of the present invention to provide a rotary electric machine or machinery which is capable of permitting coupling between a bearing holder and an insulator to be carried out without causing a deterioration in accuracy of an inner diameter of a portion of the bearing holder on which the bearing is held.

It is another object of the present invention to provide a fan motor which is capable of permitting coupling between a bearing holder and an insulator to be carried out without deteriorating accuracy of an inner diameter of a portion of the bearing holder on which the bearing is held.

It is a further object of the present invention to provide a rotary electric machine which is capable of ensuring reliable coupling between a bearing holder and an insulator.

It is still another object of the present invention to provide a rotary electric machine which is capable of facilitating coupling between a bearing holder and an insulator due to deformation by heating.

It is yet another object of the present invention to provide a rotary electric machine which is capable of permitting application of any unnecessary stress from an insulator to a bearing holder to be effectively prevented by deformation of a plurality of projections provided on the insulator.

In accordance with the present invention, a rotary electric machine is provided. The rotary electric machine includes a rotor rotated about a revolving shaft arranged so as to extend in an axial direction thereof. Also, the rotary electric machine includes a bearing holder made of a synthetic resin material and constructed into a hollow structure. The bearing holder has a forward end positioned on one of both sides defined along an axis of the revolving shaft (hereinafter referred to as "one axial side") and a rearward end positioned on the other of both sides defined along the axis of the revolving shaft and opposite to the one axial side (hereinafter referred to as "the other axial side"). Also, the bearing holder is coupled at the rearward end thereof to a casing and has at least one bearing for supporting the revolving shaft fitted therein. The rotary electric machine also includes a stator including a stator core, an insulator and a plurality of windings. The stator core is formed at a central portion thereof with a through-hole via which the bearing holder extends and includes a plurality of salient poles arranged on an outer periphery thereof so as to be spaced from each other at predetermined intervals in a peripheral direction of the revolving shaft. The insulator is made of a synthetic resin material exhibiting electrical insulating properties and arranged so as to cover a part of an outer surface of the stator core while keeping a magnetic pole surface of each of the salient poles of the stator core and an inner surface of the through-hole exposed. The windings each are formed by winding a conductive wire on each of the salient poles through the insulator. The rotary electric machine further includes a coupling structure for coupling the bearing holder and insulator to each other to prevent relative movement between the bearing holder and the stator in the axial direction of the revolving shaft and relative movement between the stator and the bearing holder in the peripheral direction of the revolving shaft. The coupling structure is constituted by at least one recess formed on the forward end of the bearing holder projecting through the through-hole of the stator core so as to be open on the one axial side and in a radial direction of the revolving shaft, as well as at least one projection provided on the insulator and tightly fitted in the recess of the bearing holder while keeping the bearing holder fully fitted in the through-hole of the stator core. The term "tightly fitted" or "tight fitting" as used herein is intended to mean fitting which is not readily released due to vibration or the like or which prevents the projection and recess fitted together from being readily disengaged from each other due to vibration or the like. Alternatively, the projection of the insulator may be press-fitted in the recess of the bearing holder. The term "press-fitted" or "press fitting" as used herein is intended to mean fitting carried out by forcibly fitting the projection in the recess by means of force at an increased magnitude, to thereby couple both to each other while deforming the projection and recess. However, tight fitting or press fitting is not necessarily employed when the projection and recess are deformed at a periphery thereof by heating, to thereby be coupled to each other as described hereinafter.

In the rotary electric machine of the present invention, it is merely required that the bearing holder is formed on the forward end thereof with the recess. This eliminates a necessity of substantially varying a thickness of the end of the bearing holder, resulting in effectively preventing a synthetic resin material of the bearing holder from escaping or receding which occurs at or near the forward end of the bearing holder when the bearing holder is made of the synthetic resin material. Thus, the present invention effectively prevents a deterioration in accuracy of a diameter of an inner periphery of the forward end of the bearing holder.

Also, in the present invention, the projection of the insulator is arranged in correspondence to the forward end of the bearing holder which is an end of the bearing holder on a side on which the stator is inserted into the bearing holder. This permits the stator to be readily inserted into the bearing holder without being obstructed by the projection. Also, it effectively prevents relative movement between the bearing holder and the stator in the peripheral direction of the revolving shaft as well as in the axial direction thereof.

Coupling between the bearing holder and the insulator may be carried out by only tight fitting between the projection and the recess or press fitting therebetween. Alternatively, in order to enhance reliability of the fitting, the projection of the insulator and the recess of the bearing holder are preferably subjected at a periphery thereof to deformation by heating, to thereby be coupled to each other while keeping the projection fitted in the recess. This further enhances coupling between the bearing holder and the insulator, resulting in the coupling being attained with increased reliability.

In this instance, deformation of the periphery by heating may be carried out so as to bend it outwardly in a radial direction of the revolving shaft. This permits the deformed projection and recess to form a hook in cooperation with each other. The hook thus formed permits forward movement of the insulator or movement thereof toward the one axial side to be more effectively prevented. In order to further enhance the advantage, it is preferable that a plurality of the projections and a plurality of portions of the forward end of the bearing holder defined between the respective adjacent two of a plurality of the recesses are deformed by heating so as to be bent outwardly in the radial direction of the revolving shaft while keeping the projections fitted in the recesses.

The recesses are preferably arranged on the forward end of the bearing holder while being spaced from each other at substantially equal intervals in the peripheral direction of the revolving shaft. Such arrangement permits spots at which the coupling is carried out to be scattered in the peripheral direction of the revolving shaft, to thereby prevent breakage of the coupling due to application of undue force thereto.

The insulator is generally constituted by two insulator halves respectively fitted on both sides of the stator core defined in the axial direction of the revolving shaft. One of the insulator halves which is positioned on the one axial side defined along the axis of the revolving shaft while keeping the bearing holder fully fitted in the through-hole of the stator includes a raised wall extending toward the one axial side from an end surface of the stator core positioned on the one axial side defined along the axis of the revolving shaft. The raised wall is integrally formed on an inner surface thereof with the projections in a manner to be spaced from each other at substantially equal intervals in the peripheral direction of the revolving shaft and project in the radial direction of the revolving shaft. The raised wall is formed into a substantially cylindrical shape and arranged so as to be concentric with the bearing holder. The raised wall is formed into an inner diameter which permits the forward end of the bearing holder to be fitted in the raised wall. The raised wall is integrally provided at a portion thereof positioned rather on the one axial side with the projections in a manner to project on the one axial side and inwardly in the radial direction of the revolving shaft. The bearing holder is subjected at a portion thereof projecting on the one axial side and beyond the raised wall to deformation by heating so as to be bent outwardly in the radial direction of the revolving shaft, resulting in being abutted against a forward end surface of the raised wall.

The raised wall preferably includes a cylindrical extension extending along the one axial direction component as compared with the projections. Arrangement of such an extension prevents deformation of a wall of the stator surrounding the windings in spite of deformation of the projections by heating.

The raised wall is preferably formed on the inner surface thereof with slits so as to be positioned between respective adjacent two of the projections and open on the side of the one axial direction component and in the radial direction. Formation of such slits permits periphery portions of the deformed recesses of the bearing holder to be entered into the slits when the projections and the periphery portions of the recesses of the bearing holder are deformed by heating. This further enhances coupling between the bearing holder and the insulator.

The bearing holder and casing may be formed so as to be integral with each other. Alternatively, they may be formed separate from each other.

The present invention may be practiced in the form of a fan motor. In accordance with this aspect of the present invention, a fan motor is provided. The fan motor includes a rotor rotated about a revolving shaft arranged so as to extend in an axial direction thereof; an impeller mounted on the rotor; a casing made of a synthetic resin material and including a frame having a wind tunnel formed therein in which the impeller is rotated, a motor housing and a plurality of webs for connecting the frame and motor housing to each other; and a bearing holder made of a synthetic resin material by injection molding and constructed into a hollow structure. The bearing holder has a forward end positioned on one axial side defined along an axis of the revolving shaft and a rearward end positioned on the other axial side defined along the axis of the revolving shaft. The bearing holder is coupled at the rearward end thereof to the motor housing of the casing and has at least one bearing for supporting the revolving shaft fitted therein. The fan motor further includes a stator including a stator core, an insulator and a plurality of windings. The stator core is formed at a central portion thereof with a through-hole via which the bearing holder extends and includes a plurality of salient poles arranged on an outer periphery thereof so as to be spaced from each other at predetermined intervals in a peripheral direction of the revolving shaft. The insulator is made of a synthetic resin material exhibiting electrical insulating properties and arranged so as to cover a part of an outer surface of the stator core while keeping a magnetic pole surface of each of the salient poles of the stator core and an inner surface of the through-hole exposed. The windings each are formed by winding a conductive wire on each of the salient poles through the insulator. The fan motor further includes a coupling structure for coupling the bearing holder and insulator to each other to prevent relative movement between the bearing holder and the stator in the axial direction of the revolving shaft and relative movement between the stator and the bearing holder in the peripheral direction of the revolving shaft. The coupling structure is constituted by a plurality of recesses formed on the forward end of the bearing holder projecting via the through-hole of the stator core so as to be open on the one axial side and in a radial direction of the revolving shaft, as well as a plurality of projections provided on the insulator and respectively fitted in the recesses of the bearing holder while keeping the bearing holder fully fitted in the through-hole of the stator core. The projections and recesses are deformed at a periphery thereof by heating, to thereby be coupled to each other while keeping the projections respectively fitted in the recesses. The forward end of the bearing holder is deformed at a portion thereof positioned between each adjacent two of the recesses by heating, to thereby be bent outwardly in the radial direction of the revolving shaft.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENT

Now, the present invention will be described hereinafter with reference to the accompanying drawings.

Figure 1:
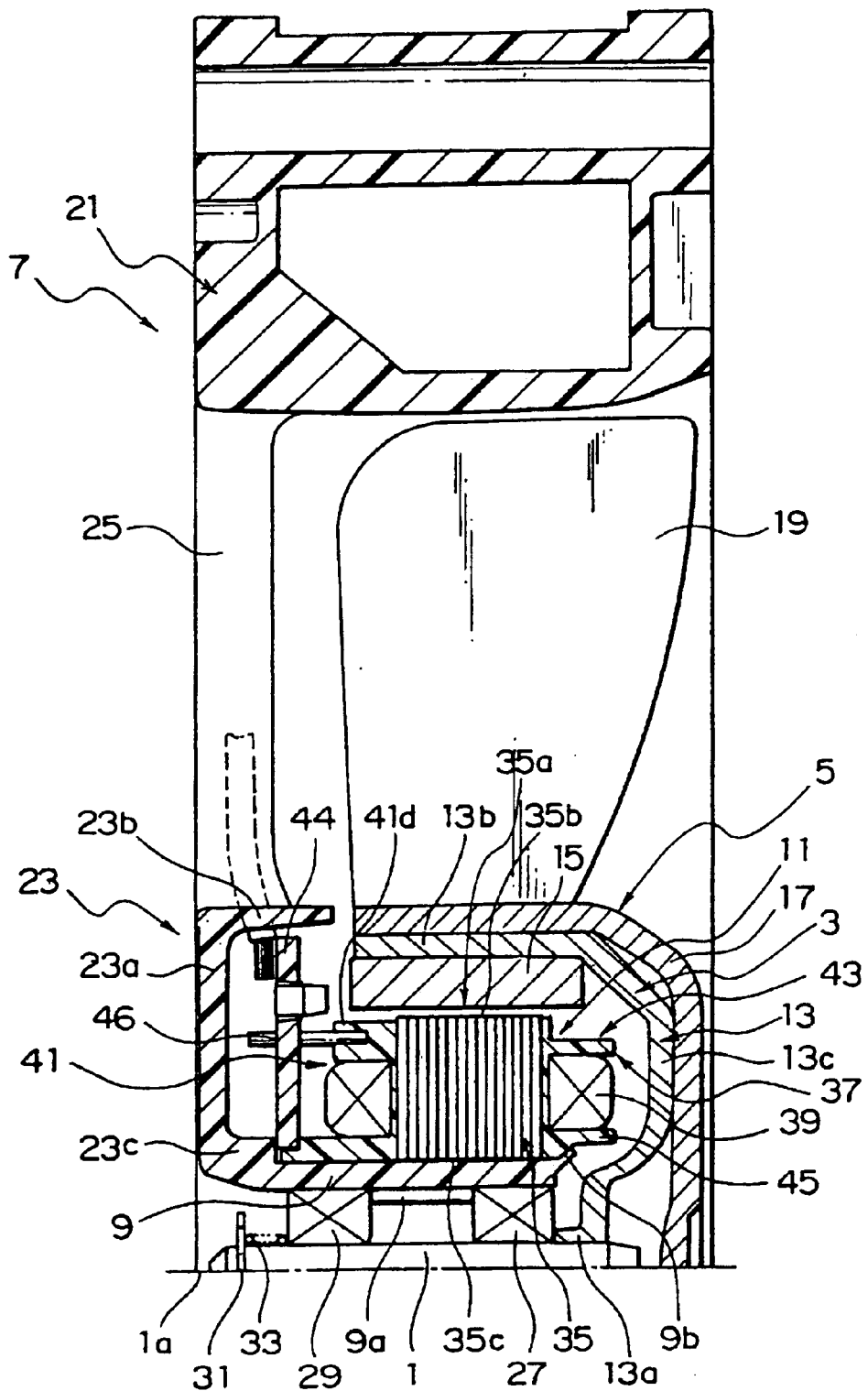
FIG. 1 is a sectional view showing an embodiment of a rotary electric machine according to the present invention, of which a half is sectioned.

Referring first to FIG. 1, an embodiment of a rotary electric machine according to the present invention is illustrated. In the illustrated embodiment, a rotary electric machine of the present invention is practiced in the form of a fan motor. In the illustrated embodiment, the rotary electric machine or fan motor includes a revolving shaft 1 constructed so as to extend in an axial direction thereof. In the illustrated embodiment, two sides which are opposite to each other are defined along an axis of the revolving shaft 1. In FIG. 1, a right-hand side along the axis of the revolving shaft 1 is defined to be one axial side. The one axial side means a side on which the fan motor discharges air or a forward side. Thus, a left-hand side along the axis of the revolving shaft 1 in FIG. 1 is defined as the other axial side. The other axial side corresponds to a side on which the fan motor sucks air or a rearward side. The rotary electric machine or fan motor of the illustrated embodiment, as shown in FIG. 1, generally includes a rotor 3 rotated about the revolving shaft 1, an impeller 5 mounted on the rotor 3, a casing 7, a bearing holder 9 and a stator 11. The rotor 3 includes a cup-like magnet support 13 made of a magnetic material and a permanent magnet 15 constituting or providing a plurality of magnetic poles. The magnet support 13 is constituted by a cylindrical boss 13a in which the revolving shaft 1 is fitted, a peripheral wall 13b arranged so as to surround the stator 11, a bottom wall 13c arranged so as to connect the boss 13a and peripheral wall 13b to each other therethrough. The permanent magnet 15 is fixed on an inner peripheral surface of the peripheral wall 13b in a manner to be opposite to a magnetic pole surface of a stator core of the stator 11. The impeller 5 includes a cup-like member 17 and a plurality of blades 19 fixed on an outer periphery of the cup-like member 17.

Figure 2:
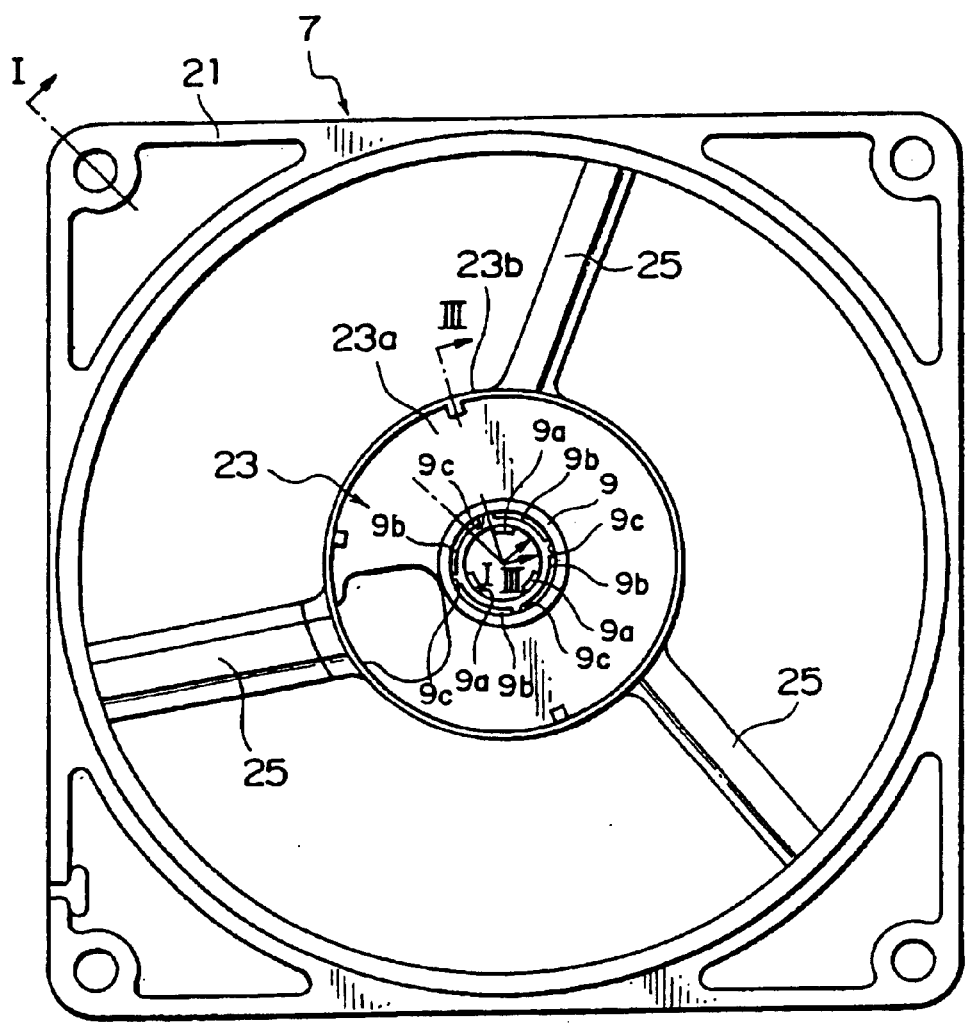
FIG. 2 is a plan view of the rotary electric machine of FIG. 1, which shows arrangement of a casing and a bearing holder prior to assembling of a fan motor.

The casing 7 and bearing holder 9, as shown in FIGS. 1 and 2, are made of a synthetic resin material by injection molding so as to be integral with each other. FIG. 2 is a plan view showing arrangement of the casing 7 and bearing holder 9 prior to assembling of the stator 1 and impeller 5, wherein the casing 7 and bearing holder 9 are viewed from a forward side or from the right-hand side in FIG. 1. FIG. 1 is a sectional view showing the casing 7 and bearing holder 9, which is taken along line I—I of FIG. 2. The casing 7 includes a frame 21 of a cylindrical shape having a wind tunnel defined therein in which the impeller 5 is rotated, a motor housing 23 arranged so as to partially surround the stator 11, and three webs 25 arranged so as to radially extend from the motor hocusing 23 toward the frame 21 and connect the motor housing 23 and frame 21 to each other therethrough. The motor housing 23 includes an annular flat plate 23a, a cylindrical wall 23b extending in a direction of the axis 1a of the revolving shaft 1 or the axial direction thereof from an outer peripheral end of the flat plate 23a, and a cylindrical projection 23c extending in the direction of the axis 1a of the revolving shaft 1 or the axial direction thereof from an inner peripheral end of the flat plate 23a. The bearing holder 9, constructed so as to be integral with casing 7, is formed into a cylindrical shape so as to surround the revolving shaft 1 while being connected at one end thereof to the cylindrical projection 23c. The bearing holder 9 is formed on an inner periphery thereof with three projections 9a projecting on a side of the revolving shaft 1 while being positioned at a substantially central portion thereof in the axial direction of the revolving shaft. Three such projections 9a are arranged in a manner to be spaced from each other at substantially equal intervals in the peripheral direction of the revolving shaft 1, resulting in functioning as a stopper for the bearings 27 and 29. Thus, spaces are defined on both sides of each of the projections 9a of the bearing holder 9 in the axial direction, respectively. The thus-formed spaces act as bearing fit spaces in which the bearings 27 and 29 in a pair are fitted, respectively. Ideally, two such bearing fit spaces should be formed so that centers thereof are aligned with each other. Deformation of a wall of the bearing holder which surrounds the bearing fit spaces causes a configuration of the bearing fit space to be necessarily varied, leading to a deterioration in accuracy of dimensions thereof. In the illustrated embodiment, the wall of the bearing holder surrounding or defining the bearing fit spaces is formed into a substantially equal thickness, to thereby effectively prevent deformation of the wall due to escaping or receding of the synthetic resin material for the casing 7 and bearing holder 9 during integral formation of the casing 7 and bearing holder 9.

Figure 3:
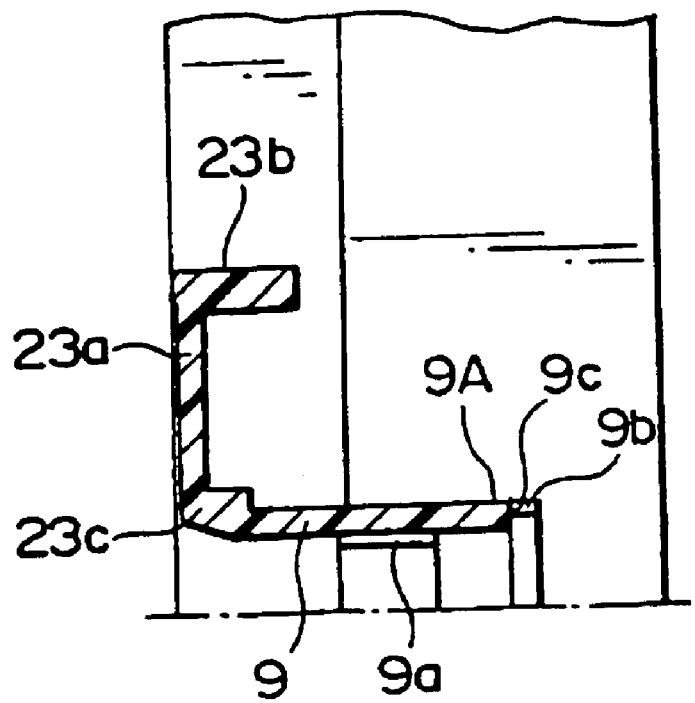
FIG. 3 is a sectional view taken along line III—III of FIG. 2.

The one bearing 27 positioned on the forward side is arranged in a manner to be interposed between the boss 13a of the magnet support 13 and the projections 9a of the bearing holder 9. The revolving shaft 1 has a snap ring 31 fitted on a rearward end thereof. Between the snap ring 31 and the other bearing 29 positioned on the rearward side is arranged a spring member 33, which functions to restrain movement or vibration of the revolving shaft 1 in the axial direction. Also, the bearing holder 9, as shown in FIG. 2 and FIG. 3 which is a sectional view taken along line III—III of FIG. 2, has four arcuate projections 9b formed on a forward end 9A thereof in a manner to be spaced from each other at substantially equal intervals in the peripheral direction of the revolving shaft 1. The projections 9b each are formed into a reduced thickness as compared with that of the wall surrounding the bearing fit spaces. Such construction permits four recesses 9c to be defined between the respective adjacent two arcuate projections 9b while being spaced from each other at substantially equal intervals in the peripheral direction of the revolving shaft 1. Four such recesses 9c each are open on the forward side and in the radial direction of the revolving shaft 1. Thus, the forward end 9A of the bearing holder 9 is so constructed that four such recesses 9c which are open on the forward side and in the radial direction of the revolving shaft 1 are arranged on a cylindrical section having an outer diameter equal to that of the wall surrounding the bearing fit spaces and an inner diameter larger than that of the wall in a manner to be spaced from each other at equal intervals in the peripheral direction of the revolving shaft 1. Thus, it would be considered that the arcuate projections 9b each are positioned between each adjacent two of the recesses 9c. The arcuate projections 9b each are bent outwardly in the radial direction after being combined with the stator 11, as described below.

The stator 11 includes a stator core 35, an insulator 37 arranged so as to cover a part of an outer surface of the stator core 35 and four windings 39. The stator core 35 is formed by laminating a plurality of steel plates on each other. The steel plates are formed with holes, which cooperate with each other to provide the stator core 35 with a central through-holes 35c via which the bearing holder 9 extends when the steel plates are laminated together to provide the stator core. The stator core 35 thus formed includes four salient poles 35a arranged thereon so as to be spaced from each other at intervals in a peripheral direction thereof and extend outwardly in a radial direction thereof. The four windings 39 each are formed by winding a conductive wire on each of the salient poles 35a through the insulator 37.

Figure 4A:
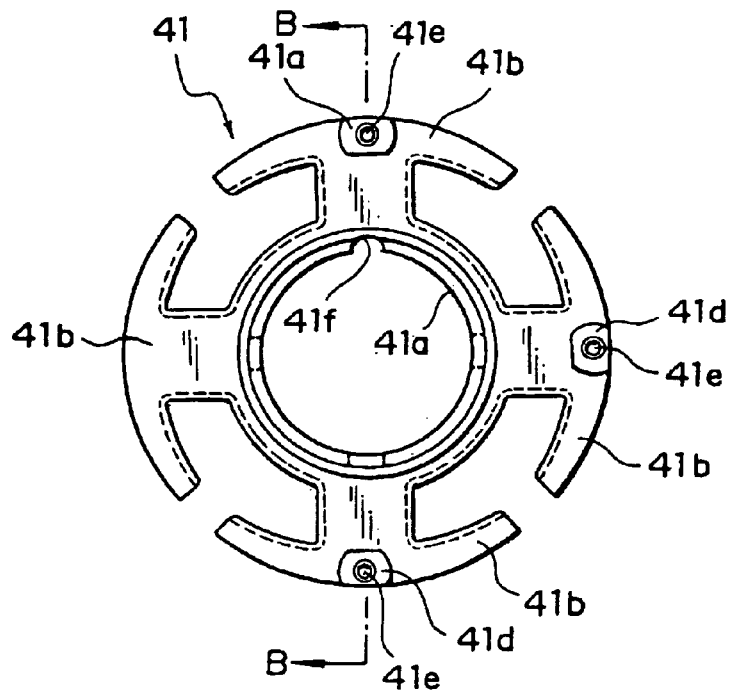
FIG. 4(A) is a plan view showing a first insulator half of an insulator incorporated in the rotary electric machine shown in FIG. 1.
Figure 4B:
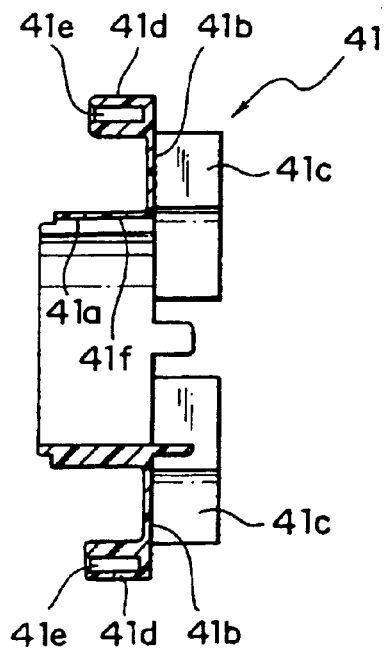
FIG. 4(B) is a sectional view taken along line B—B of FIG. 4(A)

The insulator 37 is constituted by a first insulator half 41 and a second insulator half 43 each made of a synthetic resin material exhibiting electrical insulating properties. The first and second insulator halves 41 and 43 are fitted on both sides of the stator core 35 defined in the axial direction thereof and therefore in the axial direction of the revolving shaft 1. The first and second insulator halves 41 and 43 are formed into a configuration which permits the outer surface of the stator core 35 to be partially covered therewith while keeping a magnetic pole surface 35b of each of the salient poles 35a of the stator core 35 and an inner surface of the through-hole 35c exposed. FIG. 4(A) is a plan view of the first insulator half 41 positioned rearwardly or the rearward side and FIG. 4(B) is a sectional view taken along line B—B of FIG. 4(A). As shown in FIGS. 4(A) and 4(B), the first insulator half 41 includes a raised wall 41a of a substantially cylindrical shape arranged in a manner to be concentrical with the bearing holder 9. Also, the first insulator half 41 includes four rearward side surface cover plates 41b arranged so as to extend outwardly in a radial direction of the raised wall 41a therefrom to substantially cover a rearward side surface of the stator core 35 including a rearward side surface of the salient poles 35a of the stator core 35 which is defined on a rearward side thereof or on the other axial side defined along the axis 1a of the revolving shaft 1. Further, the first insulator half 41 includes four lamination surface cover plates 41c provided in a manner to be integral with the rearward side surface cover plates 41b to cover substantially a half of a lamination surface of the steel plates or a surface thereof extending in parallel to the axial direction except for the magnetic pole surfaces 35b and the through-hole 35c. The raised wall 41a is formed on an inner periphery thereof with a slit 41f so as to positionally correspond to one of the salient poles 35a. The slit 41f is formed so as to be open in the axial direction and inwardly in a radial direction of the raised wall. Also, three of the rearward side surface cover plates 41b each are formed at a portion thereof corresponding to each of three of the salient poles 35c with a pillar 41d projecting rearwardly or on the other axial side defined along the axis of the revolving shaft. The pillars 41d each are formed with a fit hole 41e in which a connection pin 46 on which the conductive wire (FIG. 1) is wound is fitted. The connection pins 46 each are connected via a through-hole of a circuit board 44 arranged on a rearward end of the stator 11 to a circuit pattern formed on a rear surface of the circuit board 44 by soldering, resulting in the circuit pattern on the rear surface of the circuit board 44 and the windings 39 being electrically connected to each other therethrough.

Figure 5A:
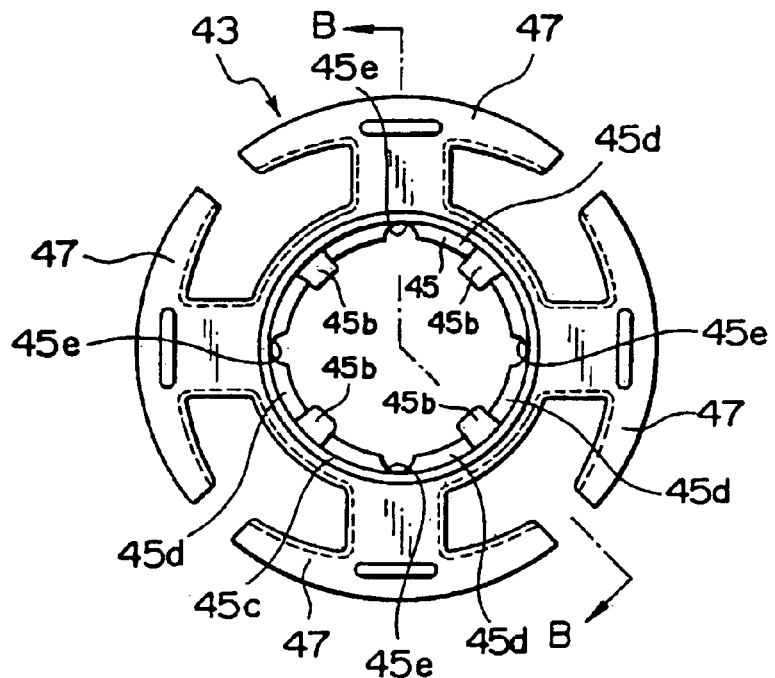
FIG. 5(A) is a plan view showing a second insulator half of an insulator incorporated in the rotary electric machine shown in FIG. 1.
Figure 5B:
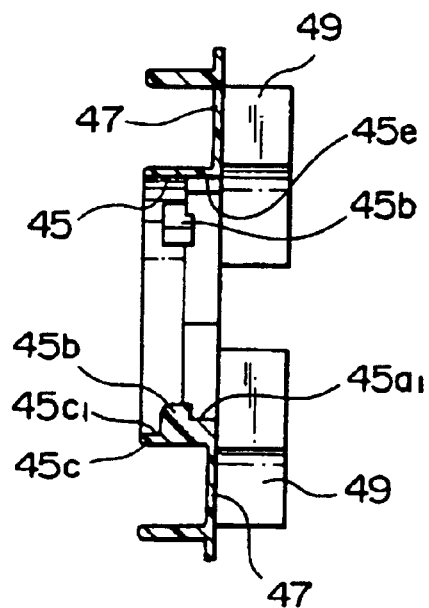
FIG. 5(B) is a sectional view taken along line B—B of FIG. 5(A)

Now, the second insulator half 43 will be described with reference to FIGS. 5(A) and 5(B), wherein FIG. 5(A) is a plan view showing the second insulator half 43 positioned forwardly on the forward side and FIG. 5(B) is a sectional view taken along line B—B of FIG. 5(A). The second insulator half 43, as shown in FIGS. 5(A) and 5(B), includes a raised wall 45 of a substantially cylindrical shape, a forward side surface cover plate 47 and four lamination surface cover plates 49 as in the first insulator half 41. The raised wall 45 is arranged so as to be substantially concentric with the bearing holder 9. The forward side surface cover plate 47 is formed so as to extend outwardly in a radial direction of the raised wall 45 therefrom, to thereby substantially cover a forward side surface of the stator core 35 including a forward side of each of the salient poles 35a defined on the one axial side. The four lamination surface cover plates 49 each are formed integrally with the forward side surface cover plate 47 and arranged so as to cover a portion of the lamination surface of the steel plates laminated on each other which is not covered by the first insulator half 41, except for the magnetic pole surface 35b of the stator core 35 and the through-hole 35c.

The raised wall 45, as shown in FIG. 1, is arranged so as to extend further forwardly from the froward end surface of the stator core 35 while keeping the bearing holder 9 fully fitted on the through-hole 35c of the stator 11. The raised wall 45 is formed into an inner diameter which permits the forward end 9A of the bearing holder 9 to be fitted in the raised wall 45. The raised wall 45 is provided at a forward portion thereof defined on a left-hand side in FIG. 5(B) with fours projections 45b so as to project forwardly of the raised wall 45 and inwardly in the radial direction. Four such projections 45b are arranged in a manner to be spaced from each other at substantially equal intervals in the peripheral direction of the revolving shaft 1 while being integral with the raised wall 45. The projections 45b function to couple the bearing holder 9 and insulator 37 to each other when they are tightly fitted or press-fitted in the recesses 9c of the bearing holder 9. Such a fit structure functions to prevent the stator 11 from moving in the peripheral direction when the projections 45 are merely fitted in the recesses 9c of the bearing holder 9.

The raised wall 45 is integrally formed with a cylindrical extension 45c in a manner to forwardly extend beyond the projections 45b. The extension 45c is formed into an inner diameter larger than the raised wall 45. Also, the raised wall 45 is provided thereon with radially extending annular surfaces 45d so as to be axially positioned between an inner peripheral surface 45a1 of the raised wall 45 and an inner peripheral surface 45c1 of the extension 45c and radially positioned between the respective adjacent two of the projections 45b. The annular surfaces 45d cooperate with each other to provide a forward end surface of the raised wall 45. The raised wall 45 is formed on an inner surface thereof with four slits 45e in a manner to be positioned between the respective adjacent two of the projections 45b. The slits 45e each are formed so as to be open forwardly and in the radial direction of the revolving shaft 1. The slits 45e each act to further enhance coupling between the bearing holder 9 and the insulator 37 by partially receiving each of the arcuate projection 9b therein when the projections 45b and recesses 9c are deformed at the periphery thereof by heating.

Figure 6:
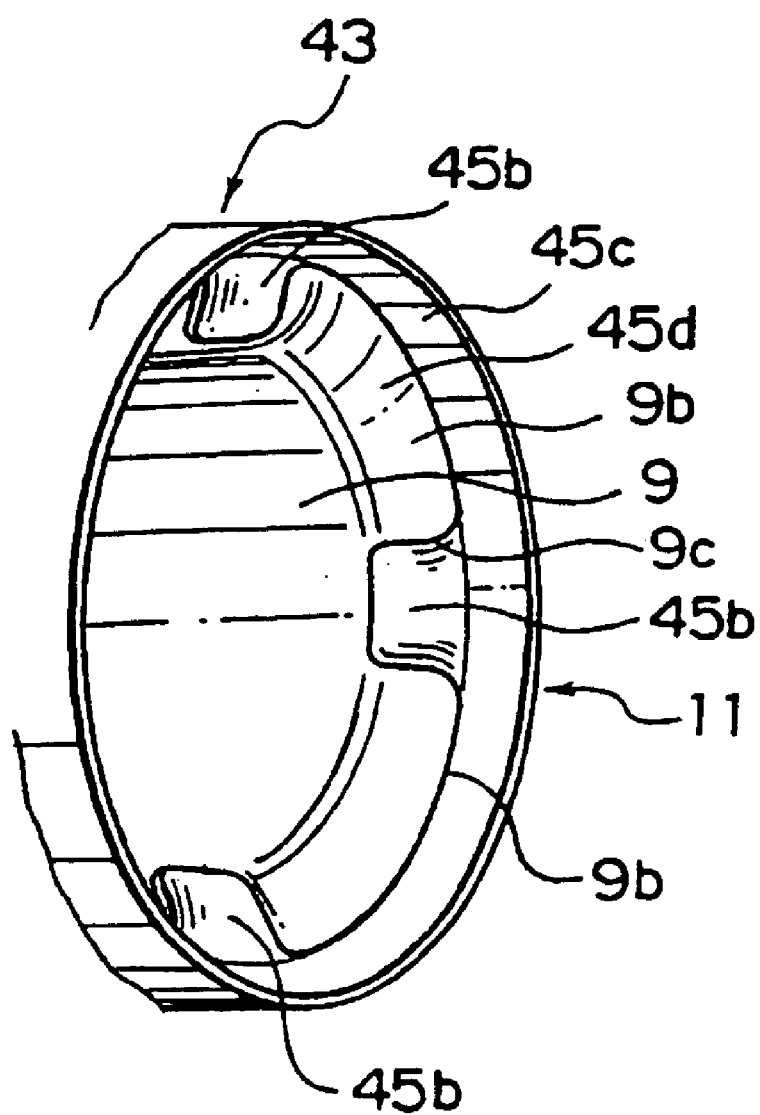
FIG. 6 is a fragmentary perspective view showing coupling between a bearing holder and an insulator of a stator.

Now, manufacture of the stator and coupling between the bearing holder 9 and the insulator 37 will be described. First of all, the first and second insulator halves 41 and 43 are assembled on the stator core 35 and then the conductive wire is wound on each of the salient poles 35a through the insulator 37 to form each of the windings 39. This results in the stator 11 being provided. Then, a lead-out wire of each of the windings 39 is connected to each of the predetermined connection pins 46 and then the circuit board 44 is mounted on the connection pins 46. This leads to assembling of a stator unit including the circuit board 44. Subsequently, the stator unit thus assembled is mounted on the bearing holder 9 formed integral with the casing 7. This is carried out by fitting the bearing holder 9 in the through-hole 35c of the stator core 35. At this time, four projections 45b of the raised wall 45 are tightly, pressedly or simply fitted in the recesses 9c of the bearing holder 9, respectively. Then, as shown in FIG. 6 which is a perspective view, the projections 45b and recesses 9c thus fitted with respect to each other are concurrently heated at the periphery thereof including the arcuate projections 9b by means of a heating trowel while applying force to the periphery, resulting in being deformed. More specifically, a tapered heating trowel which is tapered so as to be gradually reduced in diameter toward a distal end thereof is used for the heating. The trowel is heated while being inserted at the distal end thereof into a hole formed at the forward end 9A of the bearing holder 9, resulting in both heating and deformation of the periphery of the projections 45b and recesses 9c being concurrently attained. At this time, the arcuate projections 9b of the bearing holder 9 is softened or partially melted, to thereby be deformed or bent outwardly in the radial direction toward the forward end surface 45d of the raised wall 45. This results in the thus-deformed portion of each of the arcuate projections 9b acting as a hook for preventing the insulator 37 from moving forwardly or toward the one axial side with respect to the bearing holder 9. Also, this permits the periphery of the projections 45b and recesses 9c to be heated, to thereby be softened or partially melted, so that both may be coupled together. Such coupling likewise prevents the insulator 37 from moving toward the one axial side or forwardly with respect to the bearing holder 9.

In the illustrated embodiment, the projections 45b are arranged on the second insulator half 43 and the recesses 9c in which the projections 45b are fitted are provided on the forward end 9A of the bearing holder 9. Such construction of the illustrated embodiment eliminates a necessity of forming any projection at the bearing holder 9. This effectively prevents so-called escaping or receding of a synthetic resin material for the bearing holder 9 when the bearing holder 9 is formed by injection molding, to thereby satisfactorily keep accuracy of a diameter of an inner periphery of a portion of the bearing holder 9 which holds each of the bearings 27 and 29 from being reduced or deteriorated.

In the illustrated embodiment, the projections 45b and recesses 9c are deformed at the periphery thereof by heating. However, in the present invention, such deformation by heating is not necessarily required. Fixed holding of the insulator 37 with respect to the bearing holder 9 may be ensured by merely tightly fitting or press-fitting the projections 45b of the raised wall 45 in the recesses 9c of the bearing holder 9.

The illustrated embodiment is practiced in the form of a f an motor. However, it is a matter of course that the present invention may be applied to any suitable rotary electric machine other than a fan motor.

As can be seen form the foregoing, in the rotary electric machine of the present invention, it is merely required that the bearing holder is formed on the forward end thereof with the recesses. This eliminates a necessity of substantially varying a thickness of the end of the bearing holder, resulting in effectively preventing the resin of the bearing holder from escaping or receding which occurs at or near the forward end of the bearing holder when the bearing holder is made of a synthetic resin material. Thus, the present invention effectively prevents a deterioration in accuracy of a diameter of the inner periphery of the forward end of the bearing holder.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A rotary electric machine comprising:
    a rotor rotated about a revolving shaft arranged so as to extend in an axial direction thereof;
    a bearing holder made of a synthetic resin material and constructed into a hollow structure;
    said bearing holder having a forward end positioned on one axial side defined along an axis of said revolving shaft and a rearward end positioned on the other axial side defined along the axis of said revolving shaft and opposite to said one axial side;
    said bearing holder being coupled at said rearward end thereof to a casing and having at least one bearing for supporting said revolving shaft fitted therein;
    a stator including a stator core, an insulator and a plurality of windings;
    said stator core being formed at a central portion thereof with a through-hole via which said bearing holder extends and including a plurality of salient poles arranged on an outer periphery thereof so as to be spaced from each other at predetermined intervals in a peripheral direction of said revolving shaft;
    said insulator being made of a synthetic resin material exhibiting electrical insulating properties and arranged so as to cover a part of an outer surface of said stator core white keeping a magnetic pole surface of each of said salient poles of said stator core and an inner surface of said through-hole exposed;

said windings each being formed by winding a conductive wire on each of said salient poles through said insulator; and a coupling structure for coupling said bearing holder and insulator to each other to prevent relative movement between said bearing holder and said stator in the axial direction of said revolving shaft and relative movement between said stator and said bearing holder in the peripheral direction of said revolving shaft;

said coupling structure being constituted by:

at least one recess formed on said forward end of said bearing holder projecting through said through-hole of said stator core so as to be open on said one axial side and in a radial direction of said revolving shaft; and at least one projection provided on said insulator and tightly fitted in said recess of said bearing holder while keeping said bearing holder fully fitted in said through-hole of said stator core, wherein said at least one projection of said insulator and said recess of said bearing holder are subjected at a periphery thereof to deformation by heating, to thereby be coupled to each other while keeping said projection fitted in said recess.

2. A rotary electric machine as defined in claim 1, wherein said periphery is subjected to deformation by heating so as to be bent outwardly in a radial direction of said revolving shaft.

3. A rotary electric machine as defined in claim 1, wherein said recesses are arranged on said forward end of said bearing holder while being spaced from each other at substantially equal intervals in the peripheral direction of said revolving shaft; and said insulator is constituted by two insulator halves respectively fitted on both sides of said stator core defined in said axial direction;

one of said insulator halves which is positioned on said one axial side while keeping said bearing holder fully fitted in said through-hole of said stator including a raised wall extending toward said one axial side from an end surface of said stator core positioned on said one axial side;

said raised wall being integrally formed on an inner surface thereof with said projections in a manner to be spaced from each other at substantially equal intervals in the peripheral direction of said revolving shaft and project in the radial direction of said revolving shaft.

4. A rotary electric machine as defined in claim 3, wherein said raised wall is formed into a substantially cylindrical shape and arranged so as to be concentric with said bearing holder;

said raised wall is formed into an inner diameter which permits said forward end of said bearing holder to be fitted in said raised wall;

said raised wall is integrally provided at a portion thereof positioned rather on said one axial side with said projections in a manner to project on said one axial side and inwardly in the radial direction of said revolving shaft; and said bearing holder is subjected at a portion thereof projecting on said one axial side and beyond said raised wall to deformation by heating so as to be bent outwardly in the radial direction of said revolving shaft, resulting in being abutted against a forward end surface of said raised wall.

5. A rotary electric machine as defined in claim 3, wherein said raised wail includes a cylindrical extension extending on said one axial side and beyond said projections.

6. A rotary electric machine as defined in claim 3, wherein said raised wall is formed on the inner surface thereof with slits so as to be positioned between respective adjacent two of said projections and open on said one axial side and in said radial direction.

7. A rotary electric machine as defined in claim 1, wherein said bearing holder and casing are formed so as to be integral with each other.

8. A rotary electric machine comprising:

a rotor rotated about a revolving shaft arranged so as to extend in an axial direction thereof;

a bearing holder made of a synthetic resin material and constructed into a hollow structure;

said bearing holder having a forward end positioned on one axial side defined along an axis of said revolving shaft and a rearward end positioned on the other axial side defined along the axis of said revolving shaft and opposite to said one axial side;

said bearing holder being coupled at said rearward end thereof to a casing and having at least one bearing for supporting said revolving shaft fitted therein;

a stator including a stator core, an insulator and a plurality of windings;

said stator core being formed at a central portion thereof with a through-hole via which said bearing holder extends and including a plurality of salient poles arranged on an outer periphery thereof so as to be spaced from each other at predetermined intervals in a peripheral direction of said revolving shaft;

said insulator being made of a synthetic resin material exhibiting electrical insulating properties and arranged so as to cover a part of an outer surface of said stator core while keeping a magnetic pole surface of each of said salient poles of said stator core and an inner surface of said through-hole exposed;

said windings each being formed by winding a conductive wire on each of said salient poles through said insulator; and a coupling structure for coupling said bearing holder and insulator to each other to prevent relative movement between said bearing holder and said stator in the axial direction of said revolving shaft and relative movement between said stator and said bearing holder in the peripheral direction of said revolving shaft;

said coupling structure being constituted by:

at least one recess formed on said forward end of said bearing holder projecting through said through-hole of said stator core so as to be open on said one axial side and in a radial direction of said revolving shaft; and at least one projection provided on said insulator and press-fitted in said recess of said bearing holder while keeping said bearing holder fully fitted in said through-hole of said stator core, wherein said at least one projection of said insulator and said recess of said bearing holder are subjected at a periphery thereof to deformation by heating, to thereby be coupled to each other while keeping said at least one projection fitted in said recess.

9. A rotary electric machine as defined in claim 8, wherein said periphery is subjected to deformation by heating so as to be bent outwardly in a radial direction of said revolving shaft.

10. A rotary electric machine as defined in claim 8, wherein said recesses are arranged on said forward end of said bearing holder while being spaced from each other at substantially equal intervals in the peripheral direction of said revolving shaft; and said insulator is constituted by two insulator halves respectively fitted on both sides of said stator core defined in said axial direction;

one of said insulator halves which is positioned on said one axial side while keeping said bearing holder fully fitted in said through-hole of said stator including a raised wall extending toward said one axial side from an end surface of said stator core positioned on said one axial side;

said raised wall being integrally formed on an inner surface thereof with said projections in a manner to be spaced from each other at substantially equal intervals in the peripheral direction of said revolving shaft and project in the radial direction of said revolving shaft.

11. A rotary electric machine as defined in claim 10, wherein said raised wall is formed into a substantially cylindrical shape and arranged so as to be concentric with said bearing holder;

said raised wall is formed into an inner diameter which permits said forward end of said bearing holder to be fitted in said raised wall;

said raised wall is integrally provided at a portion thereof positioned rather on said one axial side with said projections in a manner to project on said one axial side and inwardly in the radial direction of said revolving shaft; and said bearing holder is subjected at a portion thereof projecting on said one axial side and beyond said raised wall to deformation by heating so as to be bent outwardly in the radial direction of said revolving shaft, resulting in being abutted against a forward end surface of said raised wall.

12. A rotary electric machine as defined in claim 11, wherein said raised wall includes a cylindrical extension extending on said one axial side and beyond said projections.

13. A rotary electric machine as defined in claim 11, wherein said raised wail is formed on the inner surface thereof with slits so as to be positioned between respective adjacent two of said projections and open on said one axial side and in said radial direction.

14. A rotary electric machine as defined in claim 8, wherein said bearing holder and casing are formed so as to be integral with each other.

15. A rotary electric machine comprising:

a rotor rotated about a revolving shaft arranged so as to extend in an axial direction thereof;

a bearing holder made of a synthetic resin material and constructed into a hollow structure;

said bearing holder having a forward end positioned on one axial side defined along an axis of said revolving shaft and a rearward end positioned on the other axial side defined along the axis of said revolving shaft;

said bearing holder being coupled at said rearward end thereof to a casing and having at least one bearing for supporting said revolving shaft fitted therein;

a stator including a stator core, an insulator and a plurality of windings;

said stator core being formed at a central portion thereof with a through-hole via which said bearing holder extends end including a plurality of salient poles arranged on an outer periphery thereof so as to be spaced from each other at predetermined intervals in a peripheral direction of said revolving shaft;

said insulator being made of a synthetic resin material exhibiting electrical insulating properties and arranged so as to cover a part of an outer surface of said stator core while keeping a magnetic pole surface of each of said salient poles of said stator core and an inner surface of said through-hole exposed;

said windings each being formed by winding a conductive wire on each of said salient poles through said insulator; and a coupling structure for coupling said bearing holder and insulator to each other to prevent relative movement between said bearing holder and said stator in the axial direction of said revolving shaft and relative movement between said stator and said bearing holder in the peripheral direction of said revolving shaft;

said coupling structure being constituted by:

a plurality of recesses formed on said forward end of said bearing holder projecting through said through-hole of said stator core so as to be open on said one axial side and in a radial direction of said revolving shaft; and a plurality of projections provided on said insulator and fitted in said recesses of said bearing holder respectively while keeping said bearing holder fitted in said through-hole of said stator core;

a plurality of said projections and a plurality of portions of said forward end positioned between respective adjacent two of a plurality of said recesses of said bearing holder being subjected to deformation by heating while keeping said projections fitted in said recesses;

said projections and forward end deformed by heating being coupled to each other;

said portions of said forward end being deformed so as to be outwardly bent in a radial direction of said revolving shaft.

16. A rotary electric machine as defined in claim 15, wherein said recesses are arranged on said forward end of said bearing holder while being spaced from each other at substantially equal intervals in the peripheral direction of said revolving shaft; and said insulator is constituted by two insulator halves respectively fitted on both sides of said stator core defined in said axial direction;

one of said insulator halves which is positioned on said one axial side while keeping said bearing holder fully fitted in said through-hole of said stator including a raised wall extending toward said one axial side from an end surface of said stator core positioned on said one axial side;

said raised wall being integrally formed on an inner surface thereof with said projections in a manner to be spaced from each other at substantially equal intervals in the peripheral direction of said revolving shaft and project in the radial direction of said revolving shaft.

17. A rotary electric machine as defined in claim 16, wherein said raised wall is formed into a substantially cylindrical shape and arranged so as to be concentric with said bearing holder;

said raised wall is formed into an inner diameter which permits said forward end of said bearing holder to be fitted in said raised wall;

said raised wall is integrally provided at a portion thereof positioned rather on said one axial side with said projections in a manner to project on said one axial side and inwardly in the radial direction of said revolving shaft; and said bearing holder is subjected at a portion thereof projecting on said one axial side and beyond said raised wall to deformation by heating so as to be bent outwardly in the radial direction of said revolving shaft, resulting in being abutted against a forward end surface of said raised wall.

18. A rotary electric machine as defined in claim 17, wherein said raised wall includes a cylindrical extension extending on said one axial side and beyond said projections.

19. A rotary electric machine as defined in claim 17, wherein said raised wall is formed on the inner surface thereof with slits so as to be positioned between respective adjacent two of said projections and open on said one axial side and in said radial direction.

20. A rotary electric machine as defined in claim 15, wherein said bearing holder and casing are formed so as to be integral with each other.

21. A fan motor comprising:

a rotor rotated about a revolving shaft arranged so as to extend in an axial direction thereof;

an impeller mounted on said rotor;

a casing made of a synthetic resin material and including a frame having a wind tunnel formed therein in which said impeller is rotated, a motor housing and a plurality of webs for connecting said frame and motor housing to each other;

a bearing holder made of a synthetic resin material by injection molding and constructed into a hollow structure;

said bearing holder having a forward end positioned on one axial side defined along an axis of said revolving shaft and a rearward end positioned on the other axial side defined along the axis of said revolving shaft;

said bearing holder being coupled at said rearward end thereof to said motor housing of said casing and having at least one bearing for supporting said revolving shaft fitted therein;

a stator including a stator core, an insulator and a plurality of windings;

said stator core being formed at a central portion thereof with a through-hole via which said bearing holder extends and including a plurality of salient poles arranged on an outer periphery thereof so as to be spaced from each other at predetermined intervals in a peripheral direction of said revolving shaft;

said insulator being made of a synthetic resin material exhibiting electrical insulating properties and arranged so as to cover a part of an outer surface of said stator core while keeping a magnetic pole surface of each of said salient poles of said stator core and an inner surface of said through-hole exposed;

said windings each being formed by winding a conductive wire on each of said salient poles through said insulator; and a coupling structure for coupling said bearing holder and insulator to each other to prevent relative movement between said bearing holder and said stator in the axial direction of said revolving shaft and relative movement between said stator and said bearing holder in the peripheral direction of said revolving shaft;

said coupling structure being constituted by:

a plurality of recesses formed on said forward end of said bearing holder projecting through said through-hole of said stator core so as to be open on said one axial side and in a radial direction of said revolving shaft; and a plurality of projections provided on said insulator and respectively fitted in said recesses of said bearing holder while keeping said bearing holder fully fitted in said through-hole of said stator core;

said projections and recesses being deformed at a periphery thereof by heating, to thereby be coupled to each other while keeping said projections fitted in said recesses, respectively;

said forward end of said bearing holder being deformed at a portion thereof positioned between each adjacent two of said recesses by heating, to thereby be bent outwardly in the radial direction of said revolving shaft.

* * * * *

UNITED STATES PATENT AND TRADEMARK OFFICE
CERTIFICATE OF CORRECTION

PATENT NO. : 6,700,262 B2  
APPLICATION NO. : 09/943135  
DATED : March 2, 2004  
INVENTOR(S) : Osawa et al.

Page 1 of 1

It is certified that error appears in the above-identified patent and that said Letters Patent is hereby corrected as shown below:

Column 14, Line 1, delete "end" and insert --and--.

Signed and Sealed this

Eighth Day of January, 2008

JON W. DUDAS  
*Director of the United States Patent and Trademark Office*